US012754121B2

(12) United States Patent
Patrow et al.

(10) Patent No.: US 12,754,121 B2
(45) Date of Patent: Oct. 6, 2026

(54) SPECTROSCOPIC MEASUREMENT METHOD

(71) Applicant: Endress+Hauser Optical Analysis, Inc., Ann Arbor, MI (US)

(72) Inventors: Joel Patrow, Ann Arbor, MI (US); Marc Winter, Gelnhausen (DE); Patrick Ehlers, Mölnlycke (SE)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 34 days.

(21) Appl. No.: 18/999,757

(22) Filed: Dec. 23, 2024

(65) Prior Publication Data

US 2026/0177468 A1 Jun. 25, 2026

(51) Int. Cl.
*G01N 15/075* (2024.01)
*G01N 15/00* (2024.01)

(52) U.S. Cl.
CPC ....... *G01N 15/075* (2024.01); *G01N 2015/03* (2013.01)

(58) Field of Classification Search
CPC .. G01N 15/075; G01N 2015/03; G01N 21/31; G01N 21/274; G01N 21/65; G01N 33/4833; G01N 2021/3196; G01N 2201/1293; G01N 2201/1296; G06N 3/096
See application file for complete search history.

(56) References Cited

U.S. PATENT DOCUMENTS 6,441,388 B1 * 8/2002 Thomas ................. G01N 21/49 250/573
7,698,080 B2 * 4/2010 Brown ................. G01N 21/359 702/28
2007/0112258 A1 * 5/2007 Soyemi ................. G01J 3/0272 250/252.1
2011/0093232 A1 * 4/2011 Alber ........................ G01J 3/28 702/104
2023/0194416 A1 * 6/2023 Seichter ................. G01N 21/31 356/326

OTHER PUBLICATIONS

Mishra, Puneet, et al., New data preprocessing trends based on ensemble of multiple preprocessing techniques, Trends in Analytical Chemistry, vol. 132, pp. 1-12 (2020).
Mishra, Puneet, et al., SPORT pre-processing can improve near-infrared quality prediction models for fresh fruits and agro-materials, Postharvest Biology and Technology, vol. 168, pp. 1-10 (2020).

* cited by examiner

*Primary Examiner* — Kara E. Geisel
*Assistant Examiner* — Carlos Perez-Guzman
(74) *Attorney, Agent, or Firm* — Gil M. Repa; Endress+Hauser Optical Analysis, Inc.

(57) ABSTRACT

A spectrometric measurement method of determining concentrations of components present in a medium of a given type exhibiting different compositions in different applications includes, for at least one new application, determining a new model for determining concentrations of target components based on measured spectra of the medium of the given type present in the new application, wherein the new model is determined based on assets for determining concentrations of reference components corresponding to the target components that have been determined for reference applications, wherein the reference components have been of interest.

18 Claims, 4 Drawing Sheets

SPECTROSCOPIC MEASUREMENT METHOD

TECHNICAL FIELD

The present disclosure relates to a spectrometric measurement method of determining concentrations of components included in a medium of a given type exhibiting different compositions in different applications.

BACKGROUND

Spectrometers, such as Raman spectrometers and absorption spectrometers, are currently employed in a large variety of different applications including industrial applications, as well as laboratory applications to determine concentrations of components of interest included in a medium at the respective application.

These applications, e.g., include applications in the petrochemical industry, on gas production, treatment and/or processing plants, as well as applications, wherein the measurements are performed on storage facilities, on supply units and/or on terminals. As examples, Raman spectrometers are employed in hydrogen, methanol and/or ammonia production plants, on steam methane reformers, on partial oxidation reformers, on coal gasifiers, on petcoke gasifiers, on biomass gasifiers and on waste gasifiers, as well as on liquid natural gas (LNG) production, processing, refrigeration and/or storage facilities to determine concentrations of application specific sets of target components to be measured in these applications.

In many of these applications, concentration measurements performed with spectrometers are, e.g., employed to monitor, to regulate and/or to control operation of a plant or facility and/or to monitor, to regulate and/or to control a process performed at the respective application. Correspondingly, there is a need to determine the concentrations of the components with high accuracy.

Spectrometers commonly include a light source transmitting excitation light to a sample of the medium and a spectrometric unit receiving measurement light resulting from an interaction, e.g., absorption, or Raman-scattering, of the excitation light with the medium and determining measured spectra of the received measurement light. The measured spectra are commonly provided to an evaluation unit determining measurement results of the concentration of target components based on the measured spectra and a previously determined model for determining the concentrations of the target components based on spectral values of the measured spectra.

In each application, the model employed is preferably an application-specific model accounting for the application-specific composition of the medium and the set of target components to be measured in the respective application. Determining a new model for each new application, in which concentrations of a new set of target components shall be measured, is however a tedious and time-consuming process.

One of the reasons for this is that determining a new model commonly requires training data including experimentally determined reference spectra of reference samples of the medium present in the respective application and reference concentrations of the concentration of each target component included in the reference samples.

Determining the training data commonly requires reference measurements on a sufficiently large number of reference samples covering a sufficiently wide range of concentrations of each target component. As a result, the number of reference measurements needed increases with the number of target components. Experimentally determining large numbers of reference spectra and the corresponding reference concentrations is further a tedious and time-consuming process. On the other hand, determining a model for a new application based on insufficient training data may significantly reduce the measurement accuracy achievable with the thus determined model.

Another reason is that determining the model requires a detailed analysis of the training data to determine spectral lines at which spectral values of measured spectra of the medium present in the respective application reliably provide information that enables for the concentration of individual target components to be accurately determined, as well as to quantitatively assess interdependencies between spectral values of the measured spectra at these spectral lines and the concentrations of the individual target components. This constitutes a demanding task. At the same time, the measurement accuracy achievable with the model strongly depends on the correct determination of spectral lines as well as on the correct assessment of the interdependencies.

There is an increasing number of new applications arising for which measurements of concentrations of application specific sets of target components included in media exhibiting application specific compositions in the different applications are required or desired. As outlined above, determining a new model for each new application arising is a tedious and time-consuming process.

Accordingly, there remains a need for further contributions in this area of technology.

As an example, there is a need to reduce the time and effort involved in determining new models for a new application in which concentrations of a new set of target components are to be measured.

As another example, there is a need to reduce the number of reference measurements on reference samples needed to determine new models and/or or to simplify the determination of the new models.

SUMMARY

The present disclosure includes a spectrometric measurement method of determining concentrations of components included in a medium of a given type exhibiting different compositions in different applications, the method comprising:

for at least two different reference applications, wherein concentrations of different sets of at least one reference component included in a medium of the given type at the respective reference application are of interest, performing the method steps of:

with a spectrometer determining reference spectra of a plurality of reference samples of the medium present in the respective reference application and determining reference concentrations of the concentration of each reference component included in the reference samples;

based on the reference spectra and the corresponding reference concentrations for each reference component determining an asset for determining concentrations of the respective reference component based on measured spectra the medium present in the respective reference application; and storing reference application data including the asset determined for each reference component and the respective reference component for which it has been determined in a database; and for at least one new application, wherein a medium of the given type includes a set of target components given by a combination of reference components that have each been interest in at least one of the reference applications performing the method steps of:

for each target component determining a target asset for determining the concentration of the respective target component in the new application to be given by one of the assets stored in the database that has been determined for one of the reference components corresponding to the respective target component;

based on the target assets determining a new model for determining concentrations of the target components based on measured spectra of the medium present in the new application;

with a spectrometer determining measured spectra of the medium present in the new application, based on the measured spectra and the new model determining measurement results of the concentrations of the target components and providing the thus determined measurement results.

Re-using the assets stored in the database, that have already been determined for reference components corresponding to the target components to be measured in the new application provides the advantage, that it significantly reduces the time and effort involved in determining the new model for the new application.

In certain embodiments, for at least one or each reference component determining the asset for determining concentrations of the respective reference component includes based on the reference spectra and the reference concentrations determining spectral lines at which spectral values of measured spectra of the medium present in the respective reference application provide information that enables for the concentration of the respective reference component to be determined.

In first embodiments, for at least one or each reference component determining the asset for determining concentrations of the respective reference component includes based on the reference spectra and the reference concentrations determining a model for determining the concentration of the respective reference component based on measured spectra of the medium present in the respective reference application.

Certain embodiments of the method according to the first embodiment further comprises in at least one of the reference applications performing the method steps of with a spectrometer determining measured spectra of the medium present in the respective reference application; and based on the measured spectra and the model determined for each reference component determining measurement results of the concentrations of each reference component and providing the thus determined measurement results.

Further embodiments of the method according to the first embodiment include a method, wherein for at least one or each reference component determining the model for determining the concentration of the respective reference component includes performing the method steps of:

based on the reference spectra and the reference concentrations determining spectral lines at which spectral values of measured spectra of the medium provide information that enables for the concentration of the respective reference component to be determined; and based on the reference spectra, the reference concentrations and the spectral lines determining the model for determining the concentration of the respective reference component to be given by an algorithm calculating measured values of the concentration of the respective reference component based on spectral values of measured spectra of the medium at these spectral lines and/or based on a weighted sum of spectral values of measured spectra of the medium at these spectral lines.

In certain embodiments of the first embodiment for at least one or each reference component determining the model for determining the concentration of the respective reference component includes at least one of:

determining the model as an algorithm accounting for non-linear relationships between spectral values of the measured spectra at individual spectral lines and the concentration of the respective reference component and/or accounting for at least one other parameter that is available or that is determinable based on spectral values of the measured spectra; and determining the model based on training data including the reference spectra and the corresponding reference concentrations by performing at least one of a multivariate data analysis and/or a principal component analysis of the training data, training a classifier to determine measured values of the concentration of the respective reference component based on measured spectra of the medium, performing a method of machine learning, and designing and training a neural network determining measured values of the concentration of the respective reference component based on measured spectra of the medium.

According to a second embodiment, for at least one new application determining the new model includes for each target component based on the target asset for determining concentrations of the respective target component determining an algorithm for determining the concentration of the respective target component based on measured spectra of the medium present in the new application.

Certain embodiments of the second embodiment include a method, wherein the targets assets include spectral lines at which spectral values of measured spectra of the medium provide information that enables for the concentration of one of the reference components corresponding to the respective target component to be determined; and determining the new model includes:

performing reference measurements on a limited number of samples or on a limited number of less than 50 samples of the medium present in the new application by with a spectrometer determining reference spectra of the samples and determining or measuring reference concentrations of each target component included in the samples; and for at least one or each target component, based on the reference spectra of the samples of the medium present in the new application and the corresponding reference concentrations determining the algorithm for determining the concentration of the respective target to be given by:

an algorithm determining the concentration of the respective target component based on spectral values of measured spectra of the medium present in the new application at the spectral lines included in the target asset for determining concentrations of the respective target component, or an algorithm determining measured values of the concentration of the respective target component based on a weighted sum of spectral values of measured spectra determined in the new application at the spectral lines included in the target asset for determining concentrations of the respective target component, wherein:

within the weighted sum each spectral values is multiplied by a weighting factor assigned to the respective spectral line, and/or determining the respective algorithm includes determining the weighting factors such, that they minimize the differences between measured values of the concentration of the respective target component determined by the algorithm based on the reference spectra of the samples of the medium present in the new application and the corresponding reference concentrations of the respective target component.

In further embodiments the target assets include models for determining the concentration of reference components corresponding to the target components and the new model is determined based on the models included in the target assets.

According to a third embodiment, for each target component, the target asset for determining concentrations of the target component includes a model for determining concentrations of one of the reference components corresponding to the respective target component, and determining the new model includes performing the method steps of:

based on the target assets determining a core model determining estimates of the concentration of each target component based on measured spectra of the medium present in the new application and the and the model included in the target asset for determining concentrations of the respective target component;

performing reference measurements on a limited number of one, at least one, less than 10 or less than 5 sample(s) of the medium present in the new application by with a spectrometer determining a reference spectrum of each sample and determining reference concentrations of the concentration of each target component included in each sample;

calibrating the core model by based on the reference spectrum of each sample and the corresponding reference concentrations determining a calibration algorithm determining measurement results the concentrations of the target components based on the estimates determined by the core model based on measured spectra of the medium present in the new application; and determining the new model to be given by the calibrated core model determining measurement results the concentrations of the target components by with the core model determining estimates of the concentrations of the target components based on measured spectra of the medium present in the new application and with the calibration algorithm determining the measurement results based on the estimates determined by the core model.

In certain embodiments of the third embodiment, the calibration algorithm is determined such, that it minimizes the difference between measurement results determined by applying the calibrations algorithm to estimates determined with core model based on each reference spectrum and the corresponding reference concentrations of each target component;

determining the calibration algorithm includes for each target component determining a function determining measured values of the concentration of the respective target component based on estimates of the concentration of the respective target component determined by the core model; and/or determining the calibration algorithm includes for each target component determining a calibration factor and determining the new model to be given by a model determining measured values of the concentration of each target component based on the product of the calibration factor for the respective target component and the estimate of the concentration of the respective target component determined by the core model.

According to a fourth embodiment, for each target component, the target asset for determining concentrations of the target component includes a model for determining concentrations of one of the reference components corresponding to the respective target component; and determining the new model includes performing the method steps of:

based on the models included in the target assets constructing a combined model for determining measurement results of the concentrations of the target components based on measured spectra of the medium present in the new application;

determining training data by with a spectrometer determining reference spectra of samples of the medium present in the new application and determining reference concentrations of the concentration of each reference component included in these samples;

with the training data training the combined model; and determining the new model to be given by the trained combined model.

Certain embodiments of the fourth embodiment further comprise at least one of:

constructing the combined model based on information on spectral lines at which spectral values of measured spectra provide information on the target components and/or information on interdependencies between spectral values of the measured spectra at these spectral lines and the concentrations of the target components provided by the models included in the target assets; and training the combined model by adjusting model parameters and/or model coefficients of the combined model such that differences between measurement results determined by the trained combined model based on the reference spectra included in the training data and the corresponding reference concentrations are minimized.

In certain embodiments, for at least one or each reference application the plurality of reference samples of the medium present in the respective reference application include at least one hundred reference samples and/or reference samples covering a predetermined and/or wide range of concentrations of each reference component.

In further embodiments, recording the reference application data includes for at least one reference application recording at least one attribute of the respective reference application; the least one attribute comprising at least one of a concentration range for each reference component within which the concentrations of respective reference component may vary and a complete list of all components included in the medium present at the reference application, and determining the target assets is performed based on the attributes recorded for the reference applications and their degree of resemblance to the corresponding attributes determined for the new application.

In certain embodiments, a) for at least one reference application determining the asset for each reference component includes based on the reference spectra or based on the reference spectra and the corresponding reference concentrations of the reference samples determining a preprocessing algorithm for preprocessing measured spectra determined in the respective reference application and determining the asset(s) based on preprocessed reference spectra and the corresponding reference concentrations; wherein the preprocessed reference spectra are determined by executing the preprocessing algorithm on the reference spectra; and recoding the asset(s) includes recording the preprocessing algorithm; and/or b) for at least one or each new application:

determining the new model includes determining a preprocessing algorithm for preprocessing measured spectra determined in the new application and determining the new model to be given by a model determining the measurement results of the concentrations of the target components based on preprocessed measured spectra determined by executing the preprocessing algorithm determined for the new application on measured spectra determined in the new application; wherein the preprocessing algorithm for preprocessing measured spectra determined in the new application is determined based on at least one of:

reference spectra or both the reference spectra and the corresponding reference concentrations of each target component of the sample(s) of the medium present in the new applications, and at least one preprocessing algorithm based on which the asset for determining concentrations of one of the reference components corresponding to one of the target assets has been determined.

In certain embodiments, at least some of the method steps are performed in a partially or fully automated manner.

The invention further includes a computer program stored in a non-transitory computer readable medium for performing the method disclosed herein, comprising:

computer code for determining the target asset for each target components based on the reference application data stored in the database, and computer code for determining the new model for the new application based on target asset.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken injunction with the accompanying drawings, wherein.

DETAILED DESCRIPTION

Figure 1:
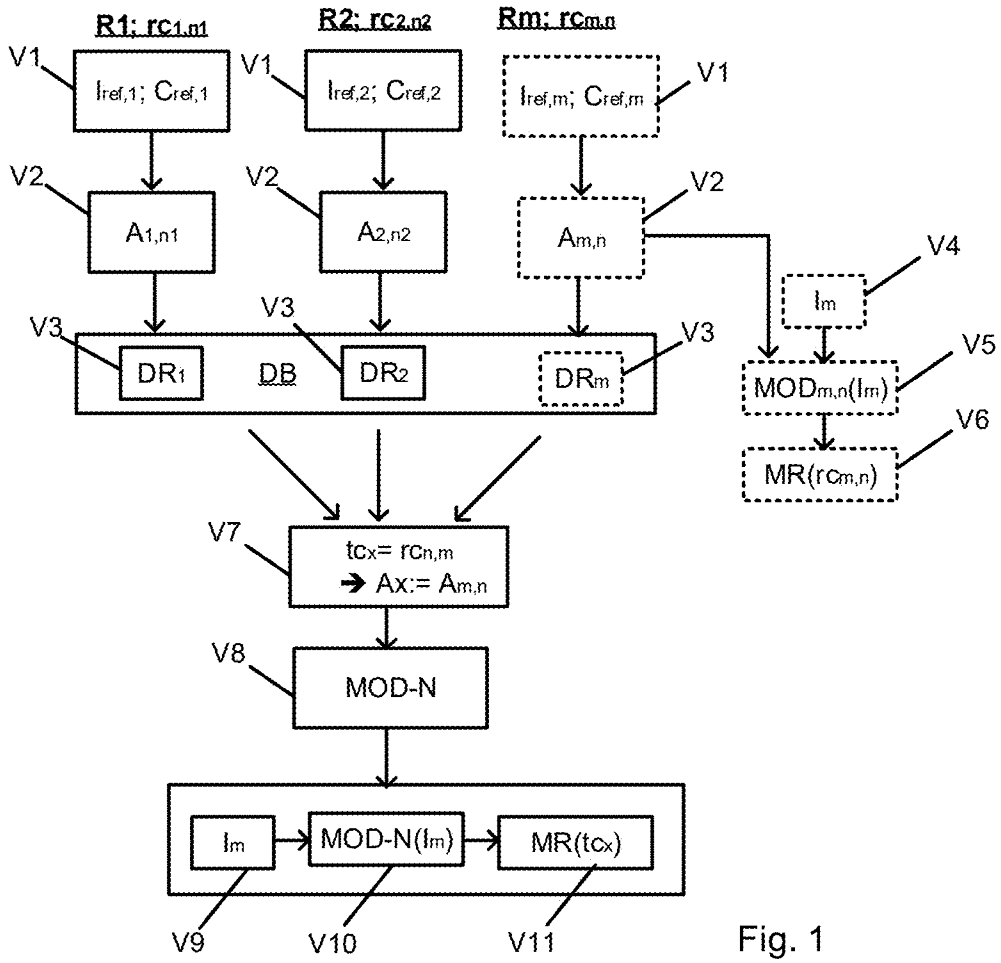
FIG. 1 shows a flow chart of a spectroscopic measurement method according to the present disclosure.

The present disclosure includes a spectrometric measurement method of determining concentrations of components included in a medium of a given type exhibiting different compositions in different applications. A flow chart of the method is shown in FIG. 1.

In certain embodiments, the type of medium is, e.g., liquid natural gas (LNG) exhibiting different compositions in different applications. In such an embodiment, the different applications, e.g., include liquid natural gas production, processing, refrigeration, transportation and/or storage facilities. In each of the different applications, the liquid natural gas may exhibit different compositions in different applications, e.g., includes methane, ethane, propane, nitrogen, carbon dioxide, butane, isobutane, isopentane, and/or at least one other component. As used in the present disclosure, an “application” includes an implementation, instance or usage of a spectrometric measurement in a given type of process, setting, situation or environment.

The method is not limited to liquid natural gases. The method may be performed in the manner described herein for any other type of liquid or gaseous medium, e.g., types of hydrogen spiked natural gases or types of media present in biopharmaceutical applications, e.g., types of cell culture media, e.g., cell culture media including microorganisms or mammalian cells and/or types of media employed in biopharmaceutical processes, e.g., in fermentation processes, exhibiting different compositions in different applications. The method of the present disclosure is especially advantageous when the type of medium is present in multiple different applications and/or exhibits compositions including multiple components.

The method includes for at least two different reference applications Rm, wherein concentrations of different sets of at least one reference component $rc_{m,n}$ included in a medium of a given type at the respective reference application Rm are of interest, performing a sequence of method steps V1, V2, V3. The sequence of method steps V1, V2, V3 is shown in FIG. 1 for two exemplary reference applications Rm, including a first reference application R1, wherein a first set of at least one reference component $rc_{1,n1}$ is of interest, and a second reference application R2, wherein a second set of at least one reference component $rc_{2,n2}$ is of interest, and can be performed for any further reference application Rm in the same way.

As an example, the first reference application R1 shown in FIG. 1 is, e.g., an application, wherein the type of medium is a liquid natural gas having a first composition and the reference components $rc_{1,n1}$ of interest include butane and propane, and the second reference application R2 is, e.g., an application, wherein the type of medium is a liquid natural gas having a second composition and the reference components $rc_{2,n2}$ of interest include pentane. The medium present in a reference application or in a sample to be analyzed of may be, e.g., a medium prevailing in a multicomponent or collective sample of interest.

For each reference applications Rm, the sequence includes a method step V1 of performing reference measurements on a plurality of reference samples of the medium present in the respective reference application Rm. These reference measurements include with a spectrometer 110 determining reference spectra $I_{ref,m}$ of the reference samples and determining, e.g., measuring, reference concentrations $C_{ref,m}$ of the concentration of each reference component $rc_{m,n}$ included in the reference samples.

In certain embodiments, the plurality of reference samples includes a large number of reference samples, e.g., at least one hundred reference samples, and/or reference samples covering a predetermined range, e.g., a wide range, of concentrations of each reference component $rc_{m,n}$.

Figure 2:
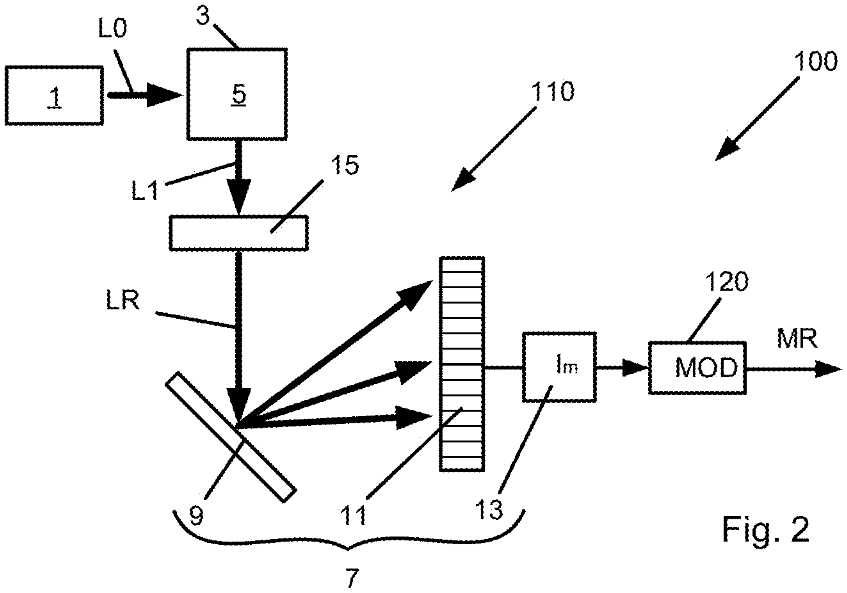
FIG. 2 shows a spectrometric measurement system.

The determination of the reference spectra $I_{ref,m}$, is illustrated in FIG. 2 showing an exemplary embodiment of a spectroscopic measurement system 100 suitable for this purpose. The spectroscopic measurement system 100 includes a spectrometer 110 configured to determine and provide measured spectra $I_m$ of samples 5 of the medium. In this example, each reference spectrum $I_{ref,m}$ is, e.g., determined as a measured spectrum $I_m$ of one of the reference samples determined with the spectrometer 110.

The exemplary spectrometer 110 shown includes a light source 1 configured to transmit excitation light L0 to a measurement region 3 configured to accommodate the respective sample 5 and includes a spectrometric unit 7 configured to receive measurement light LR resulting from an interaction, e.g., absorption or Raman-scattering, of the excitation light L0 with the sample 5. The spectrometric unit 7 is further configured to determine and provide the measured spectra $I_m$ of the received measurement light LR.

In certain embodiments, the spectrometric unit 7 may include: a disperser 9, e.g., a diffractive or holographic grating, dispersing the incident measurement light LR; a detector 11 receiving the dispersed measurement light LR; and a signal processor 13, e.g., a microprocessor, connected to the detector 11. The detector 11 is configured to determine and to provide detector signals corresponding to spectral values, e.g., spectral intensities, of the incident dispersed measurement light LR. The signal processor 13 is configured to determine and to provide spectral values of the measured spectra $I_m$ based on the detector signals.

In certain embodiments, the spectrometric measurement method disclosed herein is a Raman spectrometric measurement method. In such embodiments, the spectrometer 110 is a Raman spectrometer.

In such an embodiment, the light source 1 is a monochromatic light source, e.g., a laser, configured to transmit excitation light L0, having a predetermined excitation wavelength $\lambda_0$, to the measurement region 3 accommodating the sample 5. In certain embodiments, the excitation wavelength $\lambda_0$ is, e.g., a wavelength in the visual or near infrared wavelengths range. In addition or as an alternative, in certain embodiments, the Raman spectrometer, e.g., includes a filter 15, e.g., a notch-filter, configured to filter out measurement light LR, e.g., Raman scattered light, included in light L1 emanating from the illuminated sample 5.

The methods of the present disclosure are not limited to Raman spectroscopy. The methods of the present disclosure may also be used in context with other spectroscopic concentration measurement principles. As an example, the certain embodiments, the spectrometric measurement method disclosed herein is, e.g., an absorption spectrometric measurement method. In this case a spectroscopic measurement system including an absorption spectrometer configured to determine absorption spectra of samples of the medium is, e.g., employed.

Regardless of the type of spectroscopy employed, the determination of the reference concentrations $C_{ref,m}$ of each reference component $rc_{m,n}$ is, e.g., performed by with a corresponding concentration measurement device measuring of the concentration of the respective reference component $rc_{m,n}$ included in the reference samples.

For each reference application Rm, the method further includes a method step V2 of, based on the reference spectra $I_{ref,m}$ and the reference concentrations $C_{ref,m}$, for each reference component $rc_{m,n}$, determining an asset $A_{m,n}$ for determining concentrations of the respective reference component $rc_{m,n}$ based on measured spectra $I_m$ of the medium present in the respective reference application Rm.

The sequence of method steps performed for each reference application Rm further includes a method step V3 of storing reference application data DRm including the asset $A_{m,n}$ determined for each reference component $rc_{m,n}$ and the respective reference component $rc_{m,n}$ for which it has been determined in a database DB.

In certain embodiments, for at least one or each reference application Rm recording the reference application data DRm, e.g., additionally includes recording at least one additional attribute of the reference application Rm. Such attributes, e.g., include a concentration range for each reference component $rc_{m,n}$ within which the concentrations of respective reference component $rc_{m,n}$ may vary and/or a complete list of all components included in the medium present at the reference application Rm.

The determination of the assets $A_{m,n}$ can be performed in various ways. Exemplary embodiments are shown in FIGS. 3, 4 and 5.

Figure 3:
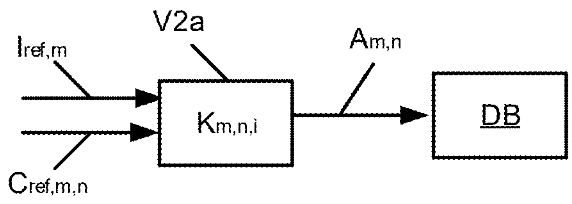
FIG. 3 shows a method of determining an asset including spectral lines.

As shown in FIG. 3, in certain embodiments, for at least one or each reference component $rc_{m,n}$, determining the asset $A_{m,n}$ for determining the concentration of the respective reference component $rc_{m,n}$, e.g., includes a method step V2*a* of, based on the reference spectra $I_{ref,m}$ and the reference concentrations $C_{ref,m}$, determining spectral lines $k_{m,n,i}$ at which spectral values $I_m(k_{m,n,i})$ of measured spectra $I_m$ of the medium present in the respective reference application Rm provide information that enables for the concentration of the respective reference component $rc_{m,n}$ to be determined. In such embodiments, storing the asset $A_{m,n}$ for determining the respective reference component $rc_{m,n}$ in the database DB includes storing the spectral lines $k_{m,n,i}$ that have been determined in method step V2*a* for the respective reference component $rc_{m,n}$.

Figure 4:
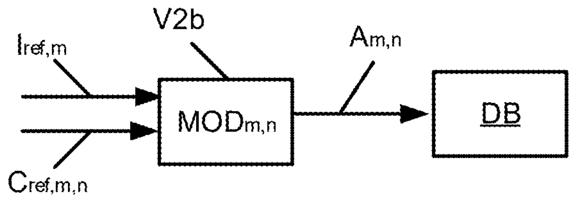
FIG. 4 shows a method of determining an asset including a model.
Figure 5:
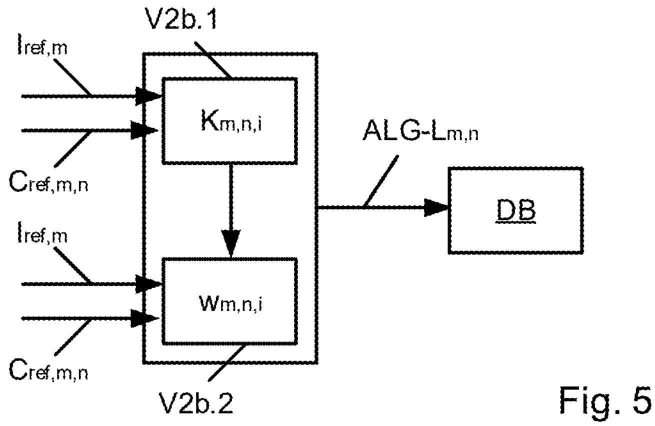
FIG. 5 shows an embodiment of the method shown in FIG. 4.

In addition or as an alternative, as shown in FIG. 4, in certain embodiments, for at least one or each reference component $rc_{m,n}$, determining the asset $A_{m,n}$ for determining the concentration of the respective reference component $rc_{m,n}$, e.g., includes a method step V2*b* of, based on the reference spectra $I_{ref,m}$ and the reference concentrations $C_{ref,m}$, determining a model $MOD_{m,n}$ for determining concentrations of the respective reference component $rc_{m,n}$ based on measured spectra $I_m$ of the medium present in the respective reference application Rm. In such embodiments, storing the asset $A_{m,n}$ for determining the concentration of the respective reference component $rc_{m,n}$ in the database DB includes storing the model $MOD_{m,n}$ that has been determined in method step V2*b* for the respective reference component $rc_{m,n}$ in the database DB.

With respect to the determination of the models $MOD_{m,n}$, model determination methods currently employed in the prior art may be used.

FIG. 5 shows an exemplary embodiment of method step V2*b* of determining the model $MOD_{m,n}$, wherein the model $MOD_{m,n}$ is determined as an algorithm $ALG\text{-}L_{m,n}$ calculating measured values $mv(rc_{m,n})$ of the concentration of the respective reference component $rc_{m,n}$ based on spectral values $I_m(k_{m,n,i})$ of measured spectra $I_m$ of the medium at spectral lines $k_{m,n,i}$ at which the spectral values $I_m(k_{m,n,i})$ of measured spectra $I_m$ of the medium present in the respective reference application Rm provide information that enables for the concentration of the respective reference component $rc_{m,n}$ to be determined.

In certain embodiments, the algorithm $ALG\text{-}L_{m,n}$ is, e.g., determined as an algorithm calculating measured values $mv(rc_{m,n})$ of the concentration of the respective reference component $rc_{m,n}$ based on a weighted sum of spectral values $I_m(k_{m,n,i})$ of measured spectra $I_m$ of the medium at spectral lines $k_{m,n,i}$ at which the spectral values $I_m(k_{m,n,i})$ of measured spectra $I_m$ of the medium present in the respective reference application Rm provide information that enables for the concentration of the respective reference component $rc_{m,n}$ to be determined, e.g., by:

$$mv(rc_{m,n}) := \sum_i w_{m,n,i} * I_m(k_{m,n,i})$$

wherein the spectral values $I_m(k_{m,n,i})$ of the measured spectrum $I_m$ at the individual spectral lines $k_{m,n,i}$ are each multiplied with a weighting factor $w_{m,n,i}$ assigned to the respective spectral line $k_{m,n,i}$.

In such an embodiment, determining the model $MOD_{m,n}$ includes a first method step V2*b*.1 of, based on the reference spectra $I_{ref,m}$ and the reference concentrations $C_{ref,m}$, determined in method step V1 for the respective reference application Rm, determining the spectral lines $k_{m,n,i}$ at which the spectral values $I_m(k_{m,n,i})$ of measured spectra $I_m$ of the medium provide information that enables for the concentration of the respective reference component $rc_{m,n}$ to be determined. The first method step V2*b*.1 is, e.g., performed based on a detailed analysis of the reference spectra $I_{ref,m}$ and the reference concentrations $C_{ref,m}$. Following this step, the method shown in FIG. 5 further includes a second method step V2*b*.2 of determining the algorithm $ALG\text{-}L_{m,n}$. As shown in FIG. 5, the second method step V2*b*.2 is preferably performed based on the reference spectra $I_{ref,m}$ and the reference concentrations $C_{ref,m}$ that have determined in method step V1 for the respective reference application Rm and the spectral lines $k_{m,n,i}$ that have been determined for the respective reference component $rc_{m,n}$ in the first method step V2*b*.1.

In certain embodiments, determining the algorithm $ALG\text{-}L_{m,n}$, e.g., includes determining the weighting factors $w_{m,n,i}$ to be assigned to the spectral lines $k_{m,n,i}$ that have been determined in the first method step V2*b*.1. In such embodiments, the weighting factors $w_{m,n,i}$ are, e.g., determined such that they minimize the differences between measured values $mv(rc_{m,n})$ of the concentration of the respective reference component $rc_{m,n}$ determined by the algorithm $ALG\text{-}L_{m,n}$ based on the reference spectra $I_{ref,m}$ of the reference samples and the corresponding reference concentrations $C_{ref,m}$ of the respective reference component $rc_{m,n}$.

In the embodiments shown in FIG. 5, storing the model $MOD_{m,n}$ determined in method step V2*b* for the respective reference component $rc_{m,n}$, e.g., includes storing the algorithm $ALG\text{-}L_{m,n}$ and/or storing the spectral lines $k_{m,n,i}$ determined in the first method step V2*b*.1 and the weighting-factors $w_{m,n,i}$ determined in the second method step V2*b*.2 for the respective reference component $rc_{m,n}$.

In addition or as an alternative, in certain embodiments, for at least one or each reference component $rc_{m,n}$ the model $MOD_{m,n}$ determined in method step V2*b* shown in FIG. 4 is, e.g., determined in another way. In such embodiments, at least one model $MOD_{m,n}$ is, e.g., determined in form of a more complex algorithm, e.g., in form of an algorithm accounting for non-linear relationships between spectral values of the measured spectra $I_m$ at individual spectral lines and the concentration of the respective reference component $rc_{m,n}$ and/or accounting for at least one other parameter that is available or determinable based on spectral values of the measured spectra $I_m$.

In addition or as an alternative, at least one model $MOD_{m,n}$, is, e.g., determined based on training data including the reference spectra $I_{ref,m}$, and the corresponding reference concentrations $C_{ref,m}$ determined in method step V1 for the respective reference application Rm. In certain embodiments, the model $MOD_{m,n}$ is, e.g., determined based on a multivariate data analysis and/or a principal component analysis of the training data. In addition or as an alternative, in certain embodiments, determining the model $MOD_{m,n}$, e.g., includes, based on the training data, training a classifier to determine measured values of the concentration of the respective reference component $rc_{m,n}$ based on measured spectra $I_m$ of the medium, performing a method of machine learning, and/or designing and training a neural network determining measured values of the concentration of the respective reference component $rc_{m,n}$ based on measured spectra $I_m$ of the medium.

Regardless of the method employed to determine the models $MOD_{m,n}$, the assets $A_{m,n}$ including the models $MOD_{m,n}$ for determining the concentrations of the reference components $rc_{m,n}$ provide the advantage that the models $MOD_{m,n}$ are subsequently available to perform spectroscopic measurements of concentrations of each reference component $rc_{m,n}$ of interest in the respective reference application Rm.

Thus, in certain embodiments, for at least one of the reference applications Rm, the method further includes a method step V4 of, with a spectrometer, e.g., the spectrometer 110, determining measured spectra $I_m$ of the medium present in the respective reference application Rm; a method step V5 of, based on the measured spectra $I_m$ and the model $MOD_{m,n}$ determined for each reference component $rc_{m,n}$, determining measurement results $MR(rc_{m,n})$ of the concentrations of the reference component(s) $cr_{m,n}$; and a method step V6 of providing the thus determined measurement results $MR(rc_{m,n})$.

The method steps V4, V5 and V6 are, e.g., performed with a spectroscopic measurement system, e.g., the spectroscopic measurement system 100 of the type shown in FIG. 2, including the spectrometer 110 determining the measured spectra $I_m$. In such an embodiment, the spectroscopic measurement system 100 further includes a signal processing unit 120 connected to or communicating with the spectrometer 110 and configured to determine and provide measurement results MR based on the measured spectra $I_m$ provided by the spectrometer 110 and on a model MOD for determining the measurement results MR.

The signal processing unit 120 is, e.g., a computer, a microprocessor or another type of calculating unit, configured to receive the measured spectra $I_m$ provided by the spectrometer 110 and to determine and provide the measurement results MR based on the measured spectra $I_m$ by executing the MOD.

In each reference application Rm, wherein the method steps V4, V5 and V6 are by performed a spectroscopic measurement system 100 configured as shown in FIG. 2, the samples 5 are given by samples of the medium present in the respective reference application Rm and the model MOD installed on and executed by the signal processing unit 120 includes the model(s) $MOD_{m,n}$ for determining the concentration of each reference component $rc_{m,n}$ to be measured in the respective reference application Rm.

Figure 6:
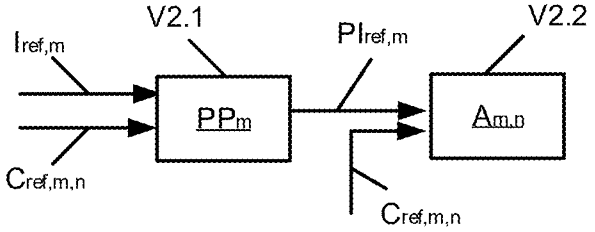
FIG. 6 shows a method of determining a preprocessing algorithm and determining an asset based on preprocessed reference spectra.

In certain embodiments, for at least one or each reference application Rm, determining the asset $A_{m,n}$ for each reference component $rc_{m,n}$ is, e.g., performed as shown in FIG. 6 by performing a method step V2.1 of, based on the reference spectra $I_{ref,m}$ or based on both the reference spectra $I_{ref,m}$ and the reference concentrations $C_{ref,m}$ of the reference samples, determining a preprocessing algorithm $PP_m$ for preprocessing measured spectra $I_m$ determined in the respective reference application Rm. As shown in FIG. 6, such methods may further include performing a method step V2.2 of determining the asset $A_{m,n}$ for each reference component $rc_{m,n}$ based on the preprocessed reference spectra $PI_{ref,m}$ and the corresponding reference concentrations $C_{ref,m}$. Here, the preprocessed reference spectra $PI_{ref,m}$ are determined by executing the preprocessing algorithm $PP_m$ on the reference spectra $I_{ref,m}$.

In such embodiments, the preprocessing algorithm $PP_m$, e.g., includes a filtering algorithm, e.g., a smoothing algorithm, for filtering measured spectra $I_m$ and/or a baselining algorithm for baselining the measured spectra $I_m$. In certain embodiments, the baselining algorithm, e.g., includes an algorithm determining baselines included in the measured spectra $I_m$ and subtracting the thus determined baselines from the measured spectra $I_m$. To this extent baselining methods known in the art may be employed.

Subsequently, the asset $A_{m,n}$ for each reference component $rc_{m,n}$ is then determined in method step V2.2 based on the preprocessed reference spectra $PI_{ref,m}$ and the corresponding reference concentrations $C_{ref,m}$, e.g., shown in FIGS. 3, 4 and 5, by performing the method steps V2*a*,V2*b* or V2*b*.1 and V2*b*.2 based on the preprocessed reference spectra $PI_{ref,m}$.

In such embodiments, recording the asset $A_{m,n}$ for each reference component $rc_{m,n}$ includes storing the preprocessing algorithm $PP_m$ based on which they have been determined.

Following this recording, the assets $A_{m,n}$ may be employed in combination with the preprocessing algorithm $PP_m$ based on which the respective asset $A_{m,n}$ has been determined.

As an example in context with the optional concentration measurements performed at the reference application(s) Rm shown in FIG. 1, method step V5 of determining the measurement results $MR(rc_{m,n})$ based on one of the models $MOD_{m,n}$ and the measured spectra $I_m$ includes preprocessing the measured spectra $I_m$ by executing the corresponding preprocessing algorithm $PP_m$ and, using the model $MOD_{m,n}$, determining the measurement results $MR(rc_{m,n})$ based on the preprocessed measured spectra.

The methods of the present disclosure recognize and leverage that the assets $A_{m,n}$ determined in method step V2 for the reference components $rc_{m,n}$ of interest in the respective reference application Rm provide valuable information that can be re-used in new applications N, wherein target components $tc_x$ included in a further medium of the same given type shall be measured, which are each given by one of the reference components $rc_{m,n}$.

As used in the present disclosure, an asset is information enabling the determination of concentrations of reference components component, which information is included in or can be determined based on the plurality of reference spectra and the corresponding reference concentration values determined in the reference application and which provide an accurate representation or characterization of conditions at the respective reference application. According to embodiments of the present disclosure, as described herein, an asset may be, e.g., information for the spectral lines at which spectral values of measured spectra of the medium present in a respective application reliably providing information on the concentration of the reference components and/or interdependencies between spectral values of the measured spectra at these spectral lines and concentrations of individual reference components. In further embodiments, as described herein, an asset may be, e.g., a model for determining concentrations of a reference component based on measured spectra of the medium present in a respective reference application. In further embodiments, as described herein, an asset may be, e.g., a preprocessing algorithm for preprocessing measured spectra determined in a reference application, which for each reference component, may be based on preprocessed reference spectra and corresponding reference concentrations.

To this extent, the method shown in FIG. 1, further includes for at least one new application N, wherein a medium of the predetermined type includes a set of at least two target components $tc_x$ given by a combination of reference components $rc_{m,n}$ that have each been of interest in at least one of the reference applications Rm, performing a sequence of method steps V7, V8, V9, V10, V11 shown in FIG. 1.

In certain embodiments, at least one or each new application N is, e.g., an application, wherein the set of target components $tc_x$ includes two or more target components $tc_x$ and/or wherein the set of target components $tc_x$ includes at least one component given by one of the reference components $rc_{m,n}$ that has been of interest in a first one of the reference applications Rm and at least one further component that is given by one of the reference components $rc_{m,n}$ that has been of interest in another one of the reference applications Rm. In context with the example given above, wherein the reference components $rc_{1,n1}$ of interest in the first reference application R1 include butane and propane and the reference component $rc_{2,n2}$ of interest in the second reference application R2 include pentane, an exemplary new application N may, e.g., be an application in which the medium is a liquid natural gas and the set of target components $tc_x$ to be measured include butane, propane and pentane.

For each new application, the method includes performing a method step V7 of, for each target component $tc_x$, determining a target asset $A_x$ for determining the concentration of the respective target component $tc_x$ in the new application N to be given by one of the assets $A_{m,n}$ stored in the database DB that has been determined for one of the reference components $rc_{m,n}$ corresponding to the respective target component $tc_x$.

This provides the advantage that it reduces time and effort involved to determine each target asset $A_x$ down to a simple process of retrieving one of the assets $A_{m,n}$ that has been determined for one of the reference components $rc_{m,n}$ corresponding to the respective target component $tc_x$ from the database DB.

In case two or more assets $A_{m,n}$ are available that have been determined for the same reference component $rc_{m,n}$ corresponding to the respective target component $tc_x$ in different reference applications Rm, the target asset $A_x$ is, e.g., determined to be given by an arbitrarily selected one of these assets $A_{m,n}$.

As an alternative option available in embodiments, wherein the reference application data DRm additionally include the attributes for the reference application Rm, determining the target asset $A_x$ is, e.g., performed based on the attributes recorded for the respective reference applications Rm and their degree of resemblance to the corresponding attributes determined for the new application N. Thus, in case two or more assets $A_{m,n}$ are available for the same reference component $rc_{m,n}$, the target asset $A_x$ is, e.g., determined to be given by one of these assets $A_{m,n}$ that has been determined for the reference application Rm, wherein the attributes most closely match the corresponding attributes of the new application N.

For each new application N, the method further includes, based on the target assets $A_x$ determined in method step V7, performing a method step V8 of determining a new model MOD-N for determining concentrations of the target components $tc_x$ based on measured spectra $I_m$ of the medium present in the new application N.

Determining the new model MOD-N based on the target assets $A_x$ provides the advantage that it significantly reduces the time and effort involved in determining the new model MOD-N.

For each new application N, the method step V8 of determining the new model MOD-N can be performed in various ways. Exemplary embodiments are shown in FIGS. 7, 8, 9 and 10.

Figure 7:
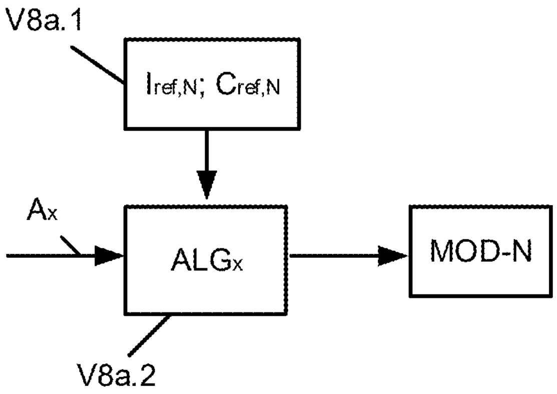
FIG. 7 shows a method of determining a new model based on target assets.

In the embodiment shown in FIG. 7, method step V8 of determining the new model MOD-N includes for each target component $tc_x$, based on the target asset $A_x$ for determining concentrations of the respective target component $tc_x$, determining an algorithm $ALG_x$ for determining the concentration of the respective target component $tc_x$ based on measured spectra $I_m$ of the medium present in the new application N. As shown in FIG. 7, in such an embodiment, determining the new model MOD-N, e.g., includes a method step V8*a*.1 of performing reference measurements on a limited number of samples of the medium present in the new application N and includes a method step V8*a*.2 of, for each target component $tc_x$, determining the algorithm $ALG_x$ for determining the concentration of the respective target component $tc_x$.

The method step V8*a*.1 of performing the reference measurements includes, with a spectrometer 110, determining reference spectra $I_{ref,N}$ of the samples and determining, e.g., measuring, reference concentrations $C_{ref,N}$ of each target component $tc_x$ included in the samples. Determining the reference spectra $I_{ref,N}$ and the reference concentrations $C_{ref,N}$ is, e.g., performed as described above in context with the reference measurements performed in method step V1 in the reference applications Rm.

In this context, the target assets $A_x$ already providing valuable information for determining the concentration of the target components $tc_x$ provides the advantage that reference measurements performed on a limited number of samples of the medium present in the new application N, e.g., less than 50 samples, is already sufficient to determine each algorithm $ALG_x$ such that a high measurement accuracy is achieved with the new model MOD-N including or consisting of these algorithms $ALG_x$. This significantly reduces the time and effort involved in performing the reference measurements.

Figure 8:
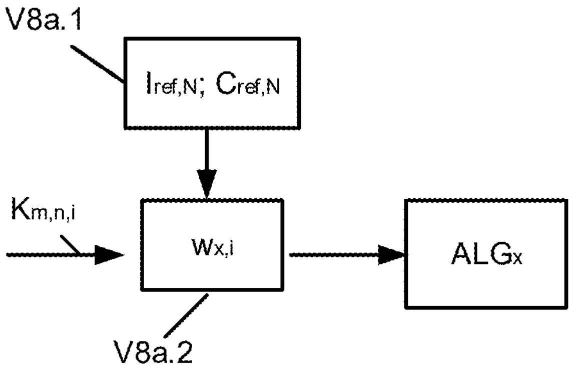
FIG. 8 shows a method of determining a new model based on target assets including spectral lines.

FIG. 8 shows an exemplary embodiment of the method shown in FIG. 7, wherein the targets assets $A_x$ include the spectral lines $k_{m,n,i}$ at which spectral values $I_m(k_{m,n,i})$ of measured spectra $I_m$ provide information that enables for the concentration of the reference component $rc_{m,n}$ corresponding to the respective target component $tc_x$ to be determined. In such an embodiment, the algorithms $ALG_x$ for determining the concentrations of the target components $tc_x$ are, e.g., each determined in form of an algorithm determining the concentration of the respective target component $tc_x$ based on spectral values $I_m(k_{m,n,i})$ of measured spectra $I_m$ of the medium present in the new application N at the spectral lines $k_{m,n,i}$ that have been determined for the reference component $rc_{m,n}$ corresponding to the respective target component $tc_x$.

In certain embodiments, at least one or each algorithm $ALG_x$ is, e.g., determined as an algorithm determining measured values $mv(tc_x)$ of the concentration of the respective target component $tc_x$ based on a weighted sum of spectral values $I_m(k_{m,n,i})$ of the measured spectra $I_m$ determined in the new application N at the spectral lines $k_{m,n,i}$ included in the respective target assets $A_x$, e.g., by:

$$mv(tc_x) := \sum_i w_{x,i} * I_m(k_{m,n,i})$$

wherein the spectral values $I_m(k_{m,n,i})$ of the measured spectra $I_m$ at these spectral lines $k_{m,n,i}$ are each multiplied by a weighting-factor $w_{x,i}$ assigned to the respective spectral line $k_{m,n,i}$.

In such an embodiment, determining the $ALG_x$ includes determining the weighting factors $w_{x,i}$ based on the reference spectra $I_{ref,N}$, and the reference concentrations $C_{ref,m,n}$ determined in method step V8*a*.1 and the spectral lines $k_{m,n,i}$ included in the target asset $A_x$. In analogy to method step V2*b*.2 described above in context with FIG. 5, the weighting factors $w_{x,i}$ are, e.g., determined such that they minimize the differences between measured values $mv(tc_x)$ of the concentration of the respective target component $tc_x$ determined by the algorithm $ALG_x$ based on the reference spectra $I_{ref,N}$ of the samples of the medium present in the new application N and the corresponding reference concentrations $C_{ref,N}$ determined in method step V8*a*.1.

In other embodiments, the target assets $A_x$, e.g., include the models $MOD_{m,n}$ for determining the concentration of the reference components $rc_{m,n}$ corresponding to the target components $tc_x$. In such embodiments, the new model MOD-N is, e.g., determined based on the models $MOD_{m,n}$ for determining the concentrations of the reference components $rc_{m,n}$ corresponding to the target components $tc_x$. Exemplary embodiments of this approach are shown in FIGS. 9 and 10.

Figure 9:
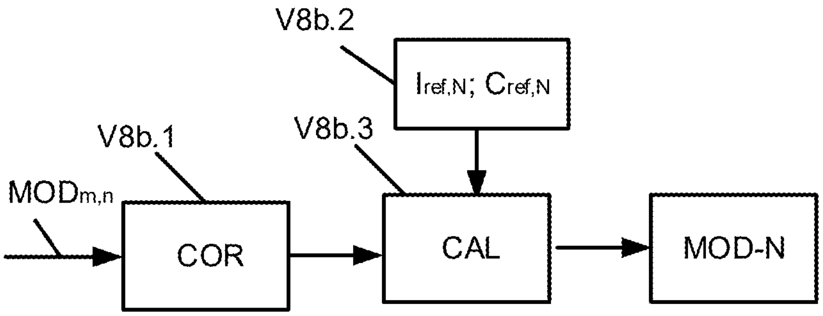
FIG. 9 shows a method of determining a new model given by a calibrated core model.
Figure 10:
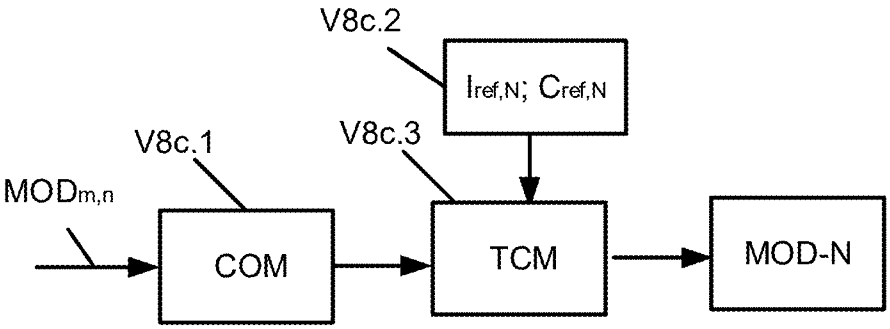
FIG. 10 shows a method of determining a new model given by a trained combined model.

In the embodiment shown in FIG. 9, the method step V8 of determining the new model MOD-N includes a method step V8*b*.1 of determining a core model COR determining estimates E of the concentrations of the target components $tc_x$ based on measured spectra $I_m$ of the medium, e.g., by:

$$E := COR(I_m),$$

In this embodiment, the core model COR, e.g., includes a model for each target component $tc_x$ that is given by the model $MOD_{m,n}$ included in the target asset $A_x$ for determining concentrations of the respective target component $tc_x$. This results in the core model COR determining estimates Ex of the concentration of each target component $tc_x$ based on the model $MOD_{m,n}$ that has been determined for one of the reference components $rc_{m,n}$ corresponding to the respective target component $tc_x$, e.g., by:

$$Ex := MOD_{m,n}(I_m).$$

The method shown in FIG. 9 further includes calibrating the core model COR and determining the new model MOD-N to be given by the calibrated core model.

Calibrating the core model COR is facilitated by the method shown in FIG. 8 further including a method step V8*b*.2 of performing reference measurements on a limited number of at least one sample of the medium present in the new application N and including a method step V8*b*.3 of calibrating the core model COR.

The method step V8*b*.2 of performing the reference measurements includes determining a reference spectrum $I_{ref,N}$ of each sample and determining, e.g., measuring, reference concentrations $C_{ref,N}$ of each target component $tc_x$ included in the sample(s). Determining the reference spectra $I_{ref,N}$ and the reference concentrations $C_{ref,N}$ is, e.g., performed as described above in context with the reference measurements performed in method step V1 in the reference applications Rm.

The core model COR determining the estimates Ex for the concentration of each target component $tc_x$ based on the model $MOD_{m,n}$ that has been determined for the corresponding reference component $rc_{m,n}$ provides the advantage that the spectral lines $k_{m,n,i}$ at which spectral values $I_m(k_{m,n,i})$ of measured spectra $I_m$ provide information that enables for the concentration of the respective target component $tc_x$ to be determined and interdependencies between spectral values $I_m(k_{m,n,i})$ of the measured spectra $I_m$ at these spectral lines $k_{m,n,i}$ and the concentration of the respective target component $tc_x$ are already accounted for. This in turn provides the advantage that reference measurements on a single sample or on a very limited number samples of the medium present in the new application N, e.g., a limited number of less than 10 or less than 5 samples, is already sufficient to calibrate the core model COR such that a high measurement accuracy is achieved with the new model MOD-N given by the calibrated core model. This significantly reduces the time and effort involved in performing the reference measurements.

The method step V8*b*.3 of calibrating the core model COR is performed based on the reference spectra $I_{ref,N}$ and the reference concentrations $C_{ref,N}$ determined in method step V8*b*.2. In certain embodiments, calibrating the core model COR, e.g., includes determining a calibration algorithm CAL for determining measurement results MR of the concentrations of the target components $tc_x$ based on the estimates E determined by the core model COR based on measured spectra $I_m$ of the medium present in the new application N. The calibration algorithm CAL is, e.g., determined so as to minimize the difference between measurement results MR determined by applying the calibrations algorithm CAL to estimates E determined with core model COR based on the reference spectra $I_{ref,N}$ determined in method step V8*b*.2 and the corresponding reference components $C_{ref,N}$.

In certain embodiments, determining the calibration algorithm CAL, e.g., includes for each target component $tc_x$ determining a function $G_x$ determining measured values $mv(tc_x)$ of the concentrations of the respective target components $tc_x$ based on the estimates E of the concentrations of the target components $tc_x$ determined by the core model COR, e.g., by:

$$mv(tc_x) := G_x(E)$$

In certain embodiments, sufficiently accurate measurement results MR may already be achieved by the calibration algorithm CAL determining measured values $mv(tc_x)$ of the concentrations of each target component $tc_x$ as a function, e.g., a linear function, of the estimates Ex of the concentrations of the respective target component $tc_x$ determined by the core model COR. In such an embodiment, determining the calibration algorithm CAL, e.g., includes determining a calibration factor $g_x$ for each target component $tc_x$. This results in the new model MOD-N given by the correspondingly calibrated core model determining the measured values $mv(tc_x)$ of the concentration of each target component $tc_x$ as or based on the product of calibration factor $g_x$ for the respective target component $tc_x$ and the estimate Ex of the concentration of the respective target component $tc_x$ determined by the core model COR, e.g., by:

$$mv(tc_x) := g_x * Ex$$

This provides the advantage that the calibration factor $g_x$ for each target component $tc_x$ is determinable based on reference measurements performed on a single sample of the medium present in the new application N.

In the embodiment of method step V8 shown in FIG. 10, the new model MOD-N is also determined based on the target assets $A_x$ including the models $MOD_{m,n}$ that have each been determined for one of the reference components $rc_{m,n}$ corresponding to the respective target component $tc_x$. In contrast to the method shown in FIG. 9, the models $MOD_{m,n}$ of FIG. 10 are not applied individually. Instead, the method shown in FIG. 10 includes a method step V8*c*.1 of, based on the models $MOD_{m,n}$ included in the target assets $A_x$, constructing a combined model COM for determining measurement results MR of the concentrations of the target components $tc_x$ based on measured spectra $I_m$ of the medium present in the new application N.

Constructing the combined model COM is, e.g., performed based on the information on spectral lines $k_{m,n,i}$ at which spectral values $I_m(k_{m,n,i})$ of measured spectra $I_m$ provide information on the target components $tc_x$ and/or on interdependencies between spectral values $I_m(k_{m,n,i})$ of the measured spectra $I_m$ at these spectral lines $k_{m,n,i}$ and the concentrations of the individual target components $tc_x$ provided by the models $MOD_{m,n}$ included in the target assets $A_x$. In addition or as an alternative feature, extraction and/or model fusion methods known in the art may be employed.

In the embodiment shown in FIG. 10, determining the new model MOD-N further includes a method step V8*c*.2 of performing reference measurements on samples of the medium present in the new application N and includes a method step V8*c*.3 of training the combined model COM.

The method step V8*c*.2 of performing the reference measurements includes determining reference spectra $I_{ref,N}$ of the samples and determining, e.g., measuring, reference concentrations $C_{ref,N}$ of each target component $tc_x$ included in the samples. Determining the reference spectra $I_{ref,N}$ and the reference concentrations $C_{ref,N}$ is once again, e.g., performed as described above in context with the reference measurements performed in method step V1 in the reference applications Rm.

In method step V8c.3, the combined model COM is then trained based on training data including the reference spectra $I_{ref,N}$ and reference concentrations $C_{ref,N}$ determined in method step V8c.2. Training the combined model COM is, e.g., performed by adjusting model parameters and/or model coefficients of the combined model COM such that differences between measurement results MR determined by the trained combined model TCM based on the reference spectra $I_{ref,N}$ and the corresponding reference concentrations $C_{ref,N}$ are minimized.

Following the training, the new model MOD-N is then determined to be given by the resulting trained combined model TCM.

Regardless of the method employed in method step V8 to determine the new model MOD-N, the new model MOD-N is subsequently available to perform spectroscopic measurements of concentrations of the target components $tc_x$ in the new application N. In this respect, for at least on or each new application N, the method shown in FIG. 1 further includes a method step V9 of, with a spectrometer 110, determining measured spectra $I_m$ of the medium present in the new application N; a method step V10 of, based on measured spectra $I_m$ and the new model MOD-N determined for the new application N, determining measurement results $MR(tc_x)$ of the concentrations of the target components $tc_x$; and a method step V11 of providing the thus determined measurement results $MR(tc_x)$.

The method steps V9, V10 and V11 are, e.g., performed by or with a spectroscopic measurement system, e.g., the spectroscopic measurement system 100 shown in FIG. 2, including the spectrometer 110 configured to determine measured spectra $I_m$ of the medium present in the new application N and the signal processing unit 120 connected to and/or communicating with the spectrometer 110 configured to determine and provide the measurement results MR based on the measured spectra $I_m$ provided by the spectrometer 110. In such an embodiment, the model MOD installed on and executed by the signal processing unit 120 is given by the new model MOD-N determined in method step V8 for the respective new application N.

Figure 11:
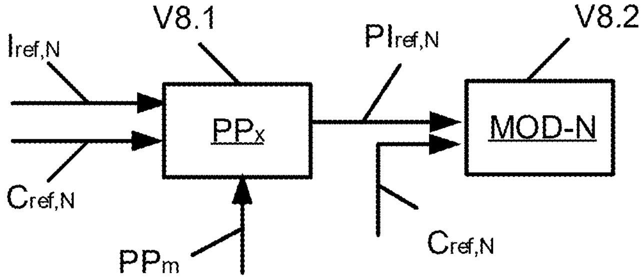
FIG. 11 shows a method of determining a new model including determining a preprocessing algorithm.

As shown in FIG. 11, in certain embodiments, for at least one or each new application N, the method step V8 of determining the new model MOD-N, e.g., includes a method step V8.1 of determining a preprocessing algorithm $PP_x$ for preprocessing measured spectra $I_m$ determined in the new application N and a method step V8.2 of determining the new model MOD-N to be given by a model determining the measurement results $MR(tc_x)$ of the concentrations of the target components $tc_x$ based on preprocessed measured spectra $PI_m$ determined by executing the preprocessing algorithm $PP_x$ that has been determined in method step V8.1 on measured spectra $I_m$ determined in the new application N.

In such embodiments, method step V8.2 of determining the new model MOD-N is, e.g., performed as described above in context with the embodiments shown in FIGS. 7, 8, 9 and 10 based on preprocessed reference spectra $PI_{ref,N}$ determined by executing the preprocessing algorithm $PP_x$ determined in method step V8.1 on the reference spectra $I_{ref,N}$ determined in method steps V8a.1, V8b.2 or V8c.2 of the respective embodiment of method step V8 of determining the new model MOD-N.

In analogy to the method step V2.1 of determining the preprocessing algorithm $PP_m$ for preprocessing measured spectra $I_m$ determined in the reference applications Rm, the preprocessing algorithm $PP_x$ for the new application N is, e.g., determined as an algorithm including a filtering algorithm, e.g., a smoothing algorithm, for filtering measured spectra $I_m$ and/or a baselining algorithm for baselining the measured spectra $I_m$.

In certain embodiments, the preprocessing algorithm $PP_x$ for preprocessing measured spectra $I_m$ determined in the new application N is, e.g., determined based on the reference spectra $I_{ref,N}$ of the sample(s) of the medium present in the new applications N or based on both the reference spectra $I_{ref,N}$ and the corresponding reference concentrations $C_{ref,N}$ of each target component $tc_x$ included in sample(s) of the medium present in the new applications N determined in method steps V8a.1, V8b.2 or V8c.2.

In certain embodiments, wherein at least one of the target assets $A_x$ is given by one of the assets $A_{m,n}$ that has been determined for one of the reference applications Rm as shown in FIG. 6 based on the preprocessed reference spectra $PI_{ref,m}$, the preprocessing algorithm $PP_x$ for the new application N is, e.g., determined based on at least one preprocessing algorithm $PP_m$ based on which the asset $A_{m,n}$ for determining concentrations of one of the reference components $rc_{ref,m}$ corresponding to one of the target assets $tc_x$ has been determined.

Regardless of whether preprocessing algorithm $PP_x$ for the new application N is determined based on the reference spectra $I_{ref,N}$, based on both the reference spectra $I_{ref,N}$ and the corresponding reference concentrations $C_{ref,N}$ of the sample(s) of the medium present in the new applications N, and/or based on the preprocessing algorithm(s) $PP_m$ based on which the assets $A_{m,n}$ corresponding to the target assets $A_x$ have been determined, the method step V10 of determining the results $MR(tc_x)$ of the concentrations of the target components $tc_x$ based on the measured spectra $I_m$ determined in the new application N includes preprocessing the measured spectra $I_m$ by executing the preprocessing algorithm $PP_x$ and with the new model MOD-N determining the measurement results $MR(tc_x)$ based on the thus determined preprocessed measured spectra.

In certain embodiments, the methods of the present disclosure may be performed in a partially or even fully automated manner. In this respect, the methods disclosed here in are, e.g., performed as computer implemented methods. The computer implemented methods of the present disclosure are, e.g., achieved by a computer program stored in a non-transitory computer readable medium for performing at least some or all of the method steps of the methods disclosed herein. Such a computer program preferably comprises computer code for determining the target asset $A_x$ for each target components $tc_x$ based on the reference application data DRm stored in the database DB and comprises computer code for determining the new model MOD-N for the new application N based on target asset $A_x$.

We claim:

1. A spectrometric measurement method of determining concentrations of components included in a medium of a given type exhibiting different compositions in different applications, the method comprising:

for at least two different reference applications, wherein concentrations of different sets of at least one reference component included in the medium of the given type at the respective reference application are of interest:

using a spectrometer, determining reference spectra of a plurality of reference samples of the medium present in the respective reference application and determining reference concentrations of the concentration of each reference component included in the reference samples;

based on the reference spectra and the corresponding reference concentrations for each reference component, determining an asset for determining concentrations of the respective reference component based on measured spectra of the medium present in the respective reference application; and storing reference application data in a database, including the asset determined for each reference component and the respective reference component for which the asset was determined; and for at least one new application, wherein a medium of the given type includes a set of target components given by a combination of reference components, each of interest in at least one of the reference applications:

for each target component, determining a target asset for determining the concentration of the respective target component in the at least one new application to be given by one of the assets stored in the database, which asset was determined for one of the reference components corresponding to the respective target component;

based on the target assets, determining a new model for determining concentrations of the target components based on measured spectra of the medium present in the new application;

using a spectrometer, determining measured spectra of the medium present in the new application; and based on the measured spectra and the new model, determining measurement results of the concentrations of the target components and providing the thus determined measurement results.

2. The spectrometric measurement method according to claim 1, wherein for at least one or each reference component, determining the asset for determining concentrations of the respective reference component includes, based on the reference spectra and the reference concentrations, determining spectral lines at which spectral values of measured spectra of the medium present in the respective reference application provide information enabling the concentration of the respective reference component to be determined.

3. The spectrometric measurement method according to claim 1, wherein for at least one or each reference component, determining the asset for determining concentrations of the respective reference component includes, based on the reference spectra and the reference concentrations, determining a reference model for determining the concentration of the respective reference component based on measured spectra of the medium present in the respective reference application.

4. The spectrometric measurement method according to claim 3, further comprising:

in at least one of the reference applications, using the spectrometer, determining measured spectra of the medium present in the respective reference application; and based on the measured spectra and the reference model determined for each reference component, determining measurement results of the concentrations of each reference component and providing the thus determined measurement results.

5. The spectrometric measurement method according to claim 3, wherein for at least one or each reference component, determining the reference model for determining the concentration of the respective reference component includes:

based on the reference spectra and the reference concentrations, determining spectral lines at which spectral values of measured spectra of the medium provide information enabling the concentration of the respective reference component to be determined; and based on the reference spectra, the reference concentrations, and the spectral lines, determining the reference model by an algorithm calculating measured values of the concentration of the respective reference component based on spectral values of measured spectra of the medium at the corresponding spectral lines and/or based on a weighted sum of spectral values of measured spectra of the medium at the corresponding spectral lines.

6. The spectrometric measurement method according to claim 3, wherein for at least one or each reference component, determining the reference model for determining the concentration of the respective reference component includes at least one of:

determining the reference model as an algorithm accounting for non-linear relationships between spectral values of the measured spectra at individual spectral lines and the concentration of the respective reference component and/or accounting for at least one other parameter available or determinable based on spectral values of the measured spectra; and determining the reference model based on training data including the reference spectra and the corresponding reference concentrations by performing at least one of:

a multivariate data analysis and/or a principal component analysis of the training data;

training a classifier to determine measured values of the concentration of the respective reference component based on measured spectra of the medium;

performing a method of machine learning; and configuring and training a neural network to determine measured values of the concentration of the respective reference component based on measured spectra of the medium.

7. The spectrometric measurement method according to claim 1, wherein for at least one new application, determining the new model includes, for each target component, based on the target asset for determining concentrations of the respective target component, determining an algorithm for determining the concentration of the respective target component based on measured spectra of the medium present in the new application.

8. The spectrometric measurement method according to claim 7, wherein:

the targets assets include spectral lines at which spectral values of measured spectra of the medium provide information enabling for the concentration of one of the reference components corresponding to the respective target component to be determined; and determining the new model includes:

performing reference measurements on a limited number of samples or on a limited number of less than 50 samples of the medium present in the new application by, using a spectrometer, determining reference spectra of the samples and determining or measuring reference concentrations of each target component included in the samples; and for at least one or each target component, based on the reference spectra of the samples of the medium present in the new application and the corresponding reference concentrations, determining the algorithm for determining the concentration of the respective target component to be given by:

an algorithm determining the concentration of the respective target component based on spectral values of measured spectra of the medium present in the new application at the spectral lines included in the target asset; or an algorithm determining measured values of the concentration of the respective target component based on a weighted sum of spectral values of measured spectra determined in the new application at the spectral lines included in the target asset, wherein:

within the weighted sum, each spectral value is multiplied by a weighting factor assigned to the respective spectral line, and/or determining the respective algorithm includes determining the weighting factors so as to minimize differences between measured values of the concentration of the respective target component determined by the algorithm based on the reference spectra of the samples of the medium present in the new application and the corresponding reference concentrations of the respective target component.

9. The spectrometric measurement method according to claim 1, wherein the target assets include asset models for determining the concentration of reference components corresponding to the target components, and wherein the new model is determined based on the asset models included in the target assets.

10. The spectrometric measurement method according to claim 1, wherein for each target component, the target asset for determining concentrations of the target component includes an asset model for determining concentrations of one of the reference components corresponding to the respective target component, and wherein determining the new model includes:

based on the target assets, determining a core model determining estimates of the concentration of each target component based on measured spectra of the medium present in the new application and on the asset model included in the target asset for determining concentrations of the respective target component;

performing reference measurements on a limited number of one, at least one, less than 10 or less than 5 sample(s) of the medium present in the new application by, using a spectrometer, determining a reference spectrum of each sample and determining reference concentrations of the concentration of each target component included in each sample;

calibrating the core model by, based on the reference spectrum of each sample and the corresponding reference concentrations, determining a calibration algorithm determining measurement results of the concentrations of the target components based on the estimates determined by the core model based on measured spectra of the medium present in the new application; and determining the new model to be given by the calibrated core model determining measurement results of the concentrations of the target components by, using the core model, determining estimates of the concentrations of the target components based on measured spectra of the medium present in the new application and, using the calibration algorithm, determining the measurement results based on the estimates determined by the core model.

11. The spectrometric measurement method according to claim 10, wherein at least one of:

the calibration algorithm is determined so as to minimize the difference between measurement results determined by applying the calibration algorithm to estimates determined with the core model based on each reference spectrum and the corresponding reference concentrations of each target component;

determining the calibration algorithm includes for each target component determining a function determining measured values of the concentration of the respective target component based on estimates of the concentration of the respective target component determined by the core model; and determining the calibration algorithm includes for each target component determining a calibration factor and determining the new model to be given by a model determining measured values of the concentration of each target component based on a product of the calibration factor for the respective target component and the estimate of the concentration of the respective target component determined by the core model.

12. The spectrometric measurement method according to claim 1, wherein for each target component, the target asset for determining concentrations of the target component includes an asset model for determining concentrations of one of the reference components corresponding to the respective target component; and determining the new model includes:

based on the asset models included in the target assets constructing a combined model for determining measurement results of the concentrations of the target components based on measured spectra of the medium present in the new application;

determining training data by, using a spectrometer, determining reference spectra of samples of the medium present in the new application and determining reference concentrations of the concentration of each reference component included in these samples;

with the training data, training the combined model; and determining the new model to be given by the trained combined model.

13. The spectrometric measurement method according to claim 12, comprising at least one of:

constructing the combined model based on information on spectral lines at which spectral values of measured spectra provide information on the target components and/or information on interdependencies between spectral values of the measured spectra at these spectral lines and the concentrations of the target components provided by the models included in the target assets; and training the combined model by adjusting model parameters and/or model coefficients of the combined model such that differences between measurement results determined by the trained combined model based on the reference spectra included in the training data and the corresponding reference concentrations are minimized.

14. The spectrometric measurement method according to claim 1, wherein for at least one or each reference application the plurality of reference samples of the medium present in the respective reference application include at least one hundred reference samples and/or reference samples covering a predetermined and/or wide range of concentrations of each reference component.

15. The spectrometric measurement method according to claim 1, wherein:

recording the reference application data includes, for at least one reference application, recording at least one attribute of the respective reference application, wherein the at least one attribute includes at least one of a concentration range for each reference component within which the concentrations of the respective reference component may vary and a complete list of all components included in the medium present in the reference application; and determining the target assets is performed based on the attributes recorded for the reference applications and their degree of resemblance to the corresponding attributes determined for the new application.

16. The spectrometric measurement method according to claim 1, wherein:

for at least one reference application:

determining the asset for each reference component includes, based on the reference spectra or based on the reference spectra and the corresponding reference concentrations of the reference samples:

determining a preprocessing algorithm for preprocessing measured spectra determined in the respective reference application;

determining the asset(s) based on preprocessed reference spectra and the corresponding reference concentrations, wherein the preprocessed reference spectra are determined by executing the preprocessing algorithm on the reference spectra; and recording the asset(s) includes recording the preprocessing algorithm; and/or for at least one or each new application:

determining the new model includes:

determining a preprocessing algorithm for preprocessing measured spectra determined in the new application; and determining the new model to be given by a model determining the measurement results of the concentrations of the target components based on preprocessed measured spectra determined by executing the preprocessing algorithm determined for the new application on measured spectra determined in the new application, wherein the preprocessing algorithm for preprocessing measured spectra determined in the new application is determined based on at least one of:

reference spectra or both the reference spectra and the corresponding reference concentrations of each target component of the sample(s) of the medium present in the new applications; and at least one preprocessing algorithm based on which the asset for determining concentrations of one of the reference components corresponding to one of the target assets has been determined.

17. The spectrometric measurement method according to claim 1, wherein at least some of the method steps are performed in a partially or fully automated manner.

18. A computer product comprising a non-transitory, computer readable medium storing instructions stored thereon that, when executed by at least one programmable processor, cause the at least one programmable processor to perform operations for performing the method of spectroscopic measurement according to claim 1, the operations comprising:

determining the target asset for each target component based on the reference application data stored in the database, and determining the new model for the new application based on the target asset.

* * * * *